(No Model.)

A. E. SELF.
HAT PIN.

No. 574,007. Patented Dec. 29, 1896.

Witnesses
E. C. Wundeman
S. J. Williamson

Inventor
Albert E. Self
by Geo. H. Holgate
Attorney

UNITED STATES PATENT OFFICE.

ALBERT E. SELF, OF PHILADELPHIA, PENNSYLVANIA.

HAT-PIN.

SPECIFICATION forming part of Letters Patent No. 574,007, dated December 29, 1896.

Application filed April 17, 1896. Serial No. 588,013. (No model.)

*To all whom it may concern:*

Be it known that I, ALBERT E. SELF, a subject of the Queen of Great Britain, residing at Philadelphia, in the county of Philadelphia and State of Pennsylvania, have invented certain new and useful Improvements in Hat-Pins, of which the following is a specification.

My invention relates to a new and useful improvement in hat-pins and fastenings therefor, and has for its object to provide devices of this description by means of which a hat may be secured to the head of a wearer so as to preclude the possibility of it being blown off or otherwise removed by accident.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring by letter to the accompanying drawings, forming a part of this specification, and in which—

Figure 1:
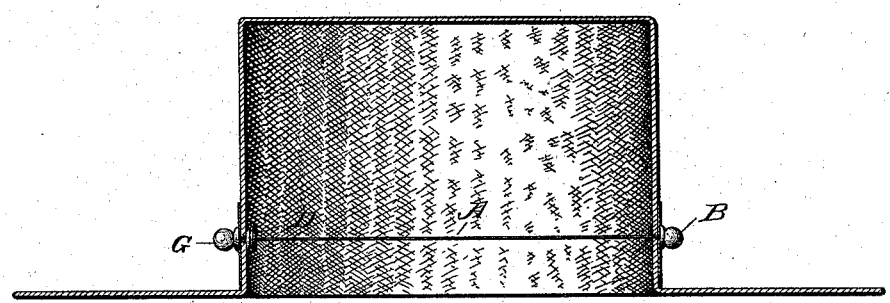
Figure 2:
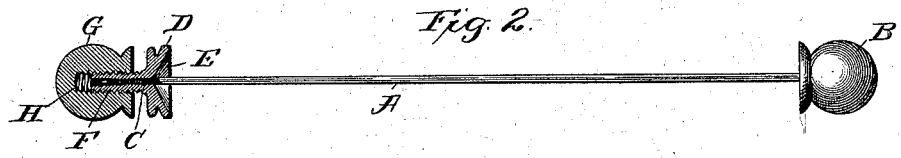
Figure 3:
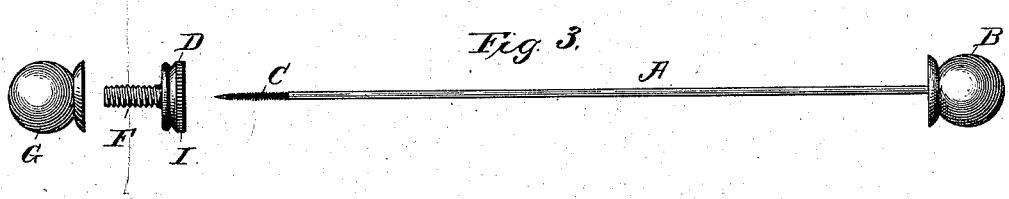

Figure 1 is a central section of a hat, showing the application of my improvement thereto; Fig. 2, a side elevation of the pin, the bushing into which it is threaded being in section; and Fig. 3, a view of the several parts disconnected.

Referring in detail to the drawings, A represents the pin, which is provided with a suitable head B and having its point threaded at C. These threads are adapted to engage with internal threads formed in the bushing D, which latter consists of a head having a funnel-shaped surface E, formed upon the inner face thereof, and a shank F, threaded externally. G is a nut, of any desired contour, which is provided with internal threads H for the reception of the threaded shank F, and in practice this shank is passed through the material of which the hat is made and clamped thereto by the running of the nut thereon, as clearly shown in Fig. 1. When in position, the head held by the nut remains upon the hat, and to secure the hat to the head of the wearer after it has been placed thereon the pin A is passed through the hat from the opposite side upon which said head is secured through the hair of the wearer and finally screwed into the head, from whence it cannot be accidentally displaced, and will therefore retain the hat in position.

The funnel-shaped surface E is for the purpose of guiding the point of the pin to the interior threads, so as to avoid annoyance in locating the point of the pin relative to these threads, as will be readily understood. If desired, a suitable escutcheon may be placed upon the opposite side of the hat from the bushing in any convenient manner, having a hole therein adapted for the passage of the pin, and by this arrangement the guidance of the pin would be further facilitated.

To render the attachment of the head to the hat and the securing of the nut upon the shank thereof easy of accomplishment, said head may be knurled, as indicated at I. It is also obvious that any design of nut may be used and the head B may be made to correspond therewith, or they may be made of different designs, as fancy may elect.

In some cases it may be found desirable to secure the bushing upon the hat by riveting the shank against a washer previously passed thereon.

Slight modifications might be made in the construction here shown without departing from the spirit of my invention, and I therefore do not wish to be limited to its exact construction.

What I claim as new and useful is—

1. In a device of the character described, a hat-pin having its end threaded, a bushing having internal threads for the reception of said threaded end and a conical cavity leading thereto, a shank formed with the bushing having external threads and a nut threaded on said shank, as and for the purpose described.

2. In combination with a hat-pin having its end threaded, of a bushing having internal threads for the reception of said threaded end, a shank formed with said bushing, and a nut adapted to engage threads upon said shank for securing the bushing to the hat, as shown and described.

In testimony whereof I have hereunto affixed my signature in the presence of two subscribing witnesses.

ALBERT E. SELF.

Witnesses:
S. S. WILLIAMSON,
MARK BUFORD.